United States Patent
Jensen

(10) Patent No.: US 6,659,707 B2
(45) Date of Patent: Dec. 9, 2003

(54) LOADING PLATFORM SYSTEM

(75) Inventor: Jens Herman Jensen, Ulfborg (DK)

(73) Assignee: Sörensen Hydraulik, Zweigniederlassung, Ulfborg, Filial afSörensen Hydraulik GmbH, Tyskland, Ulfborg (DK)

( * ) Notice: Subject to any disclaimer, the term of this patent is extended or adjusted under 35 U.S.C. 154(b) by 6 days.

(21) Appl. No.: 09/759,950

(22) Filed: Jan. 12, 2001

(65) Prior Publication Data

US 2001/0051091 A1 Dec. 13, 2001

(30) Foreign Application Priority Data

Jan. 22, 2000 (EP) .............................. 00101307

(51) Int. Cl.⁷ ................................ B60P 1/44
(52) U.S. Cl. ...................... 414/557; 414/545
(58) Field of Search ................ 414/545, 556, 414/557, 558; 187/351, 359, 363

(56) References Cited

U.S. PATENT DOCUMENTS

| | | | | |
|---|---|---|---|---|
| 2,639,150 A | * | 5/1953 | Aberle | 187/351 |
| 3,257,011 A | * | 6/1966 | Randell et al. | 414/557 |
| 3,602,381 A | * | 8/1971 | Size | 414/557 |
| 3,799,373 A | * | 3/1974 | Randell | 414/557 |
| 3,800,915 A | * | 4/1974 | Himes | 414/545 |
| 3,883,014 A | * | 5/1975 | Glomski et al. | 414/557 |
| 4,078,676 A | * | 3/1978 | Mortenson | 414/558 |
| 4,395,187 A | * | 7/1983 | Corley, Jr. | 414/558 |
| 4,729,712 A | * | 3/1988 | Corley, Jr. | 414/557 |
| 5,263,808 A | * | 11/1993 | Kent | 414/545 |

FOREIGN PATENT DOCUMENTS

| | | | | |
|---|---|---|---|---|
| GB | 2125103 | * | 2/1984 | 414/545 |
| JP | 57-182534 | * | 11/1982 | 414/558 |
| JP | 61-71238 | * | 4/1986 | 414/545 |

* cited by examiner

Primary Examiner—James W. Keenan
(74) Attorney, Agent, or Firm—Klaus J. Bach

(57) ABSTRACT

In a loading platform system for mounting on a vehicle, especially a truck provided with a loading platform mounted to the vehicle by a lift support structure which is operated by a lift actuator for lifting and lowering loads onto, and from, a vehicle loading bed by way of the loading platform, a locking structure is provided for locking the loading platform in its raised position in which its surface is in planar alignment with the vehicle loading bed, thereby preventing exposure of the lift actuator to the stresses generated by heavy loads disposed on the loading platform during loading and unloading of the vehicle.

8 Claims, 3 Drawing Sheets

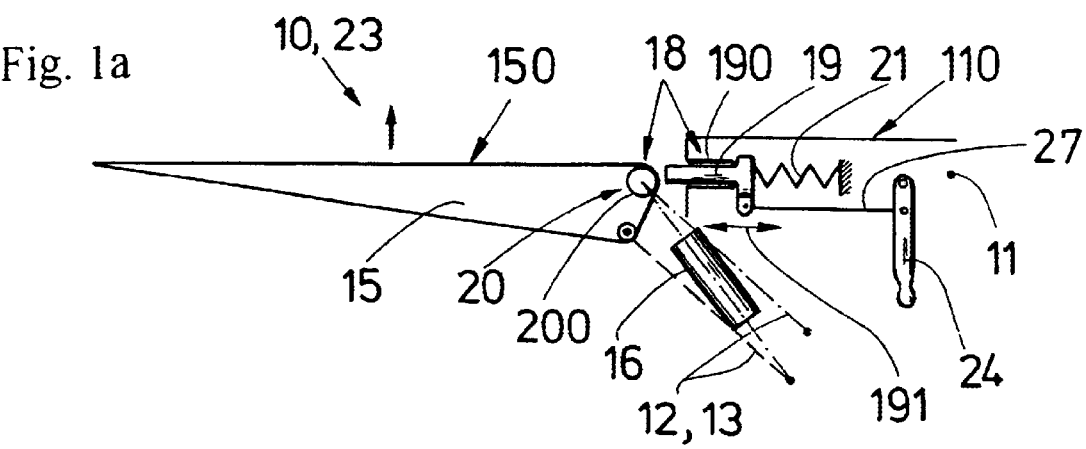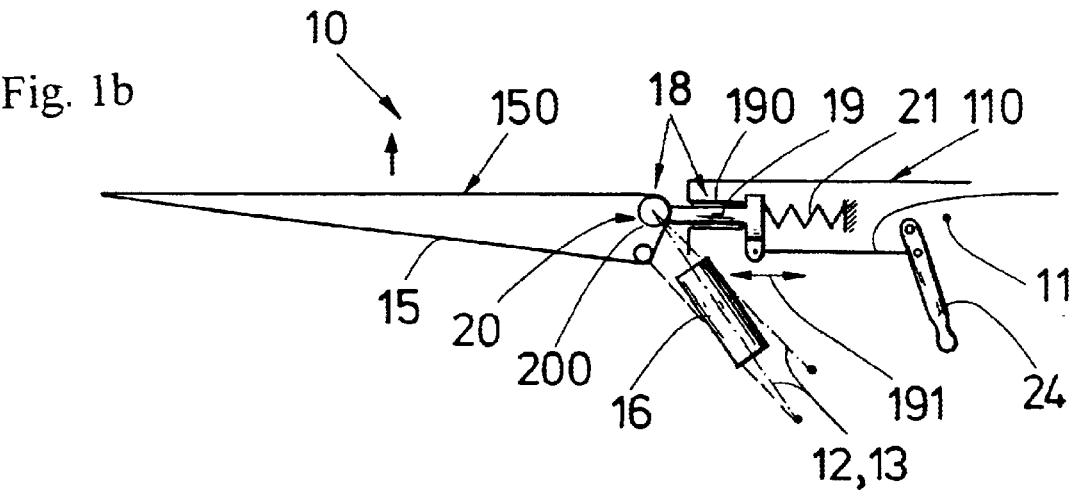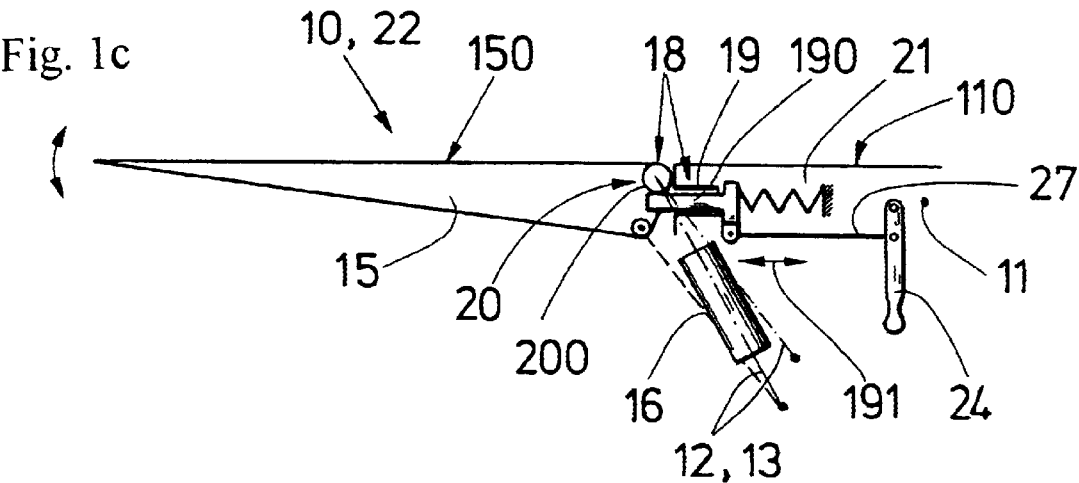

Fig. 2a
Fig. 2b
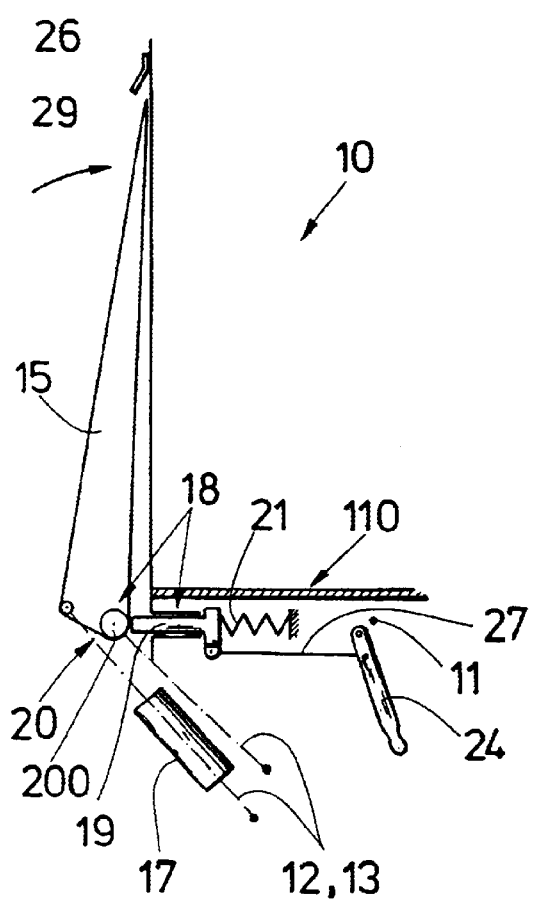
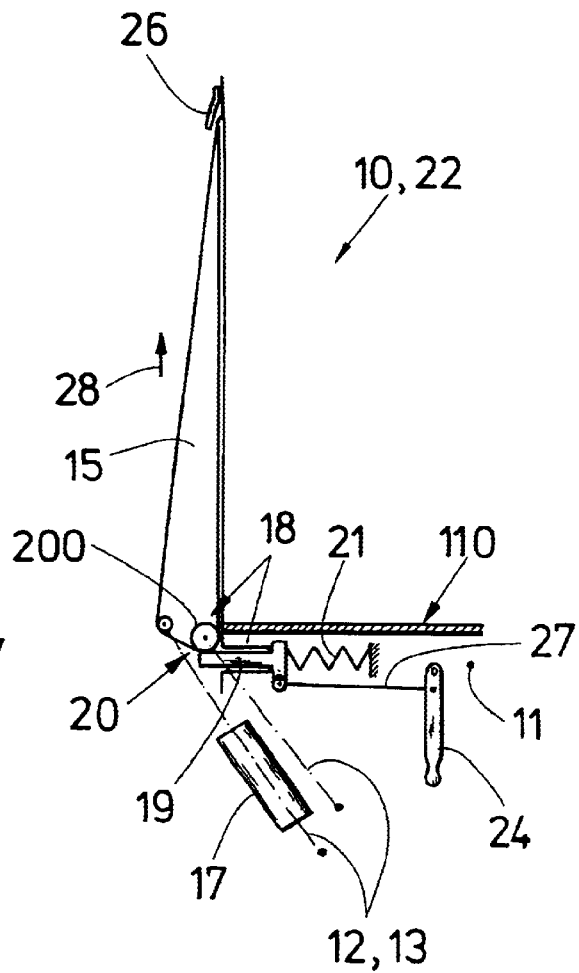

LOADING PLATFORM SYSTEM

The invention relates to a loading platform system for mounting on vehicle, particularly on trucks, comprising a platform lifting structure, an essentially plate-like loading platform for lifting and lowering loads and at least one lifting actuator mechanism for lifting and lowering the loading platform.

Such a loading platform system is described for example in EP-A-0 808 747. Loading platform systems of various designs have long been known. They are used particularly in connection with trucks in order to facilitate the lowering of loads carried by the truck from the truck loading bed to the ground on which the truck stands. From there, the load can be transported to its final destination by other means. The same is true for the loading of a truck. The load is first placed onto the loading platform while the loading platform is at ground level. The loading platform is then raised to the level of the loading bed of the truck and the load is then moved onto the loading bed.

In some designs of loading platform systems, the platform is pivoted, after completion of the unloading and loading procedure, from its horizontal position in which the loading and unloading occurs, to a vertical position for closing the rear access opening of the loading bed or a trunk-like loading space.

In other loading platform system designs, so-called folding loading platforms, the loading platform is not pivoted from a horizontal to a vertical position and vice versa. Rather, after the loading or, respectively, unloading procedure, the loading platform is folded and moved below the loading bed, that is, below the rear part of the loading bed of the truck.

For the raising and lowering of the loading board platform in an essentially horizontal orientation for the loading and unloading of a truck, a so-called lift actuator structure is used. Such an actuator structure is operated hydraulically, pneumatically, electrically or in another suitable way. For the pivoting of the loading platform from the vertical to a horizontal position and vice versa, that is, for the opening and closing of the loading bed space, a pivot actuator structure is used which operates hydraulically, pneumatically, electrically or in some other suitable way. Loading platform systems of the type referred to above therefore include at least two actuator structures. Generally, the lift actuator cooperates with one support structure for the loading platform whereas the pivot actuator cooperates with another loading platform support structure. The loading platform support structures may, but do not need to, include parallelogram type support lever arrangements. A loading platform pivot structure however is—as previously mentioned—only provided if the loading platform needs to be pivoted from a horizontal to a vertical position and vice versa.

It is known that, during loading and unloading, the raised loading platform, which then forms an extension of the loading bed of the truck, may be subjected to extremely high loads. For example fork lifts may be used for the loading and unloading procedure. In that case, the loading platform is not only subjected to the weight of the load but also the weight of the forklift used in the loading and unloading procedure.

The truck may be loaded or unloaded for example from the ramp of a warehouse while the loading platform is raised and disposed adjacent the ramp. A forklift carrying a load may then drive over the loading platform for loading the loads onto the truck bed or removing them therefrom.

In this way, the loading platform may be subjected to substantial loads, which increases the wear of the loading platform system. However, also from a safety point of view such loading of the loading platform is highly problematic since already partial failure of individual elements of the loading platform system may have fatal results for the persons performing the loading and unloading tasks. Also the loads being handled and the components of the loading platform system may be damaged upon failure of a component of the loading platform system.

It is the object of the present invention to provide a loading platform system of the type as described above, which is safely held in its raised position and wherein, in the raised position of the loading platform, the actuating structure remains free from stresses even when the loading platform is subjected to high loads. The system should furthermore be easy and inexpensive to manufacture and easy to handle during operation and wear of the actuating mechanism should be essentially eliminated while the loading platform is held in its raised position for loading and unloading.

SUMMARY OF THE INVENTION

In a loading platform system for mounting on a vehicle, especially a truck provided with a loading platform mounted to the vehicle by a lift support structure which is operated by a lift actuator for lifting and lowering loads onto, and from, a vehicle loading bed by way of the loading platform, means are provided for locking the loading platform in its raised position in which its surface is in planar alignment with the vehicle loading bed, thereby preventing exposure of the lift actuator to the stresses generated by heavy loads disposed on the loading platform during loading and unloading of the vehicle.

The arrangement according to the invention has the advantage, that with the loading platform locked in its raised position, for example fork lifts can drive onto and over the loading platform while the loading platform remains firmly positioned without transmitting the load to the lift support structure and the actuating mechanism. The arrangement is simple and can easily be retrofitted to existing loading platform systems. It may also be installed in newly manufactured loading platform systems, without the need for changes of the current design. The arrangement is furthermore inexpensive and simple to operate.

In a preferred embodiment concerning a loading platform system, in which the loading platform is pivotable from a horizontal to a vertical position for closing the load bed of the truck, the loading platform can also be locked in the vertical position. With the arrangement as shown in FIG. 2, the loading platform is safely locked in the vertical truck bed closing position so that it cannot be opened without disengaging the locking means. No stresses are transmitted to the actuating mechanism while the loading platform is locked in its vertical load bed closing position.

Basically only one locking means is needed to lock the loading platform in a particular position but two or more locking means may be used if it is expected that the loading platform will be subjected to large loads.

The locking means may be constructed in various ways. Preferably, the locking means includes a pin-like locking bolt, which is mounted on the vehicle and by which the loading platform is engaged or disengaged while the loading platform is raised and/or pivoted to a vertical position.

A pin-like locking bolt represents a simple embodiment as it requires merely a linear guide structure or bearing in which the bolt can be moved axially back and forth in order to engage or disengage an abutment structure on the loading platform.

The locking bolt can be engaged with, or disengaged from, the loading platform in any suitable way, for example, by electric motors or electromagnetic means. Preferably, however, the locking bolt is moved into, and held in, its engagement position by a pressure means, especially by a hydraulically or pneumatically operated piston and cylinder structure. A very simple pressure means is a compression spring.

If the loading platform is for example in a raised position at the same level as the loading bed of the truck and the pin-like locking bolt is in engagement with the locking structure on the loading platform, the loading platform could be unlocked manually. For example a handle may be provided which is connected to the locking bolt by a cable or a linkage for moving the locking bolt out of its locking position.

It is however particularly advantageous if the arrangement is such that the locking bolt can be moved to its unlocking position by initiating actuation of the lift actuator mechanism for lowering the loading platform. In this case, there is a coupling between the lowering that is the initiation of the lowering movement and the disengagement action of the locking bolt from the loading platform. This is possible for a system with a hydraulic, a pneumatic, electric, electric-motor or other kind of operating means. The same is true for the disengagement, which can be achieved by the source operating means. It is however also possible to use different power means for operating the lift actuator mechanism on one hand and the disengagement of the locking bolt from the loading platform on the other.

The engagement structure on the loading platform may comprise one or more sleeves—depending on the number of locking bolts used—into which the locking bolts are inserted. However, because of the possibly high bending moments generated, upon loading of the loading platform, on the lifting and possibly also the tilting structure of the loading platform when it is locked in the raised position, the engagement structure of the loading platform preferably includes a roller element or, respectively, several roller elements under which the locking member or pin moves in the locking position. An elastic deformation of the loading platform when loaded while being locked and a slight pivoting because of the moment applied to the support structures will then not detrimentally affect the locking bolt as the roller elements permit slight movement of the bolt relative to the loading platform.

Below, an embodiment of the invention will be described in greater detail with reference to the accompanying schematic drawings.

BRIEF DESCRIPTION OF THE DRAWINGS

FIGS. 1a, 1b and 1c show the loading platform in different positions as it is moved upwardly up to the level of the loading bed of a truck, in which position it is locked by a locking bolt, FIG. 2a shows the loading platform system of FIGS. 1a–1c, wherein the loading platform however is in a vertical position just before being locked in this position, FIG. 2b shows the loading platform locked in the vertical position.

DESCRIPTION OF PREFERRED EMBODIMENTS

Figure 3:
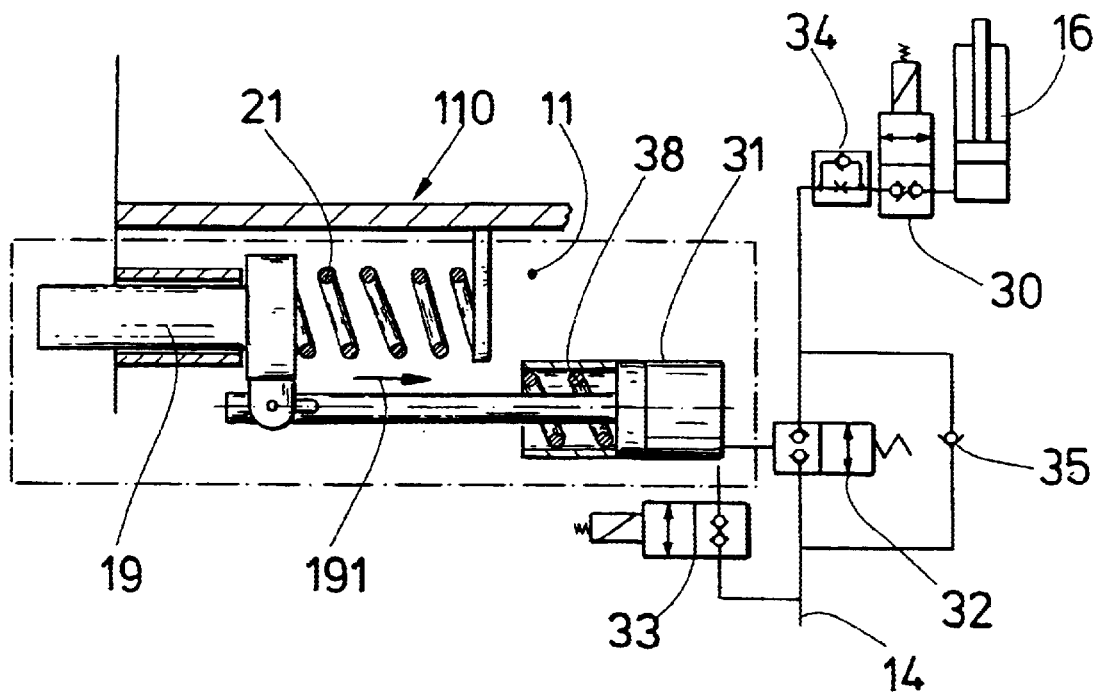
FIG. 3 shows a hydraulic or pneumatic control arrangement for operating the locking bolt in connection with the operation of the platform lift and pivot actuators.

Loading platform systems 10 for mounting on vehicles 11, particularly trucks, are well known to the art. Such loading platform systems are described in detail for example in U.S. Pat. No. 6,082,958. The specific design of such systems is therefore described herein only in as much as it is necessary for an understanding of the present invention. Basically, a loading platform system comprises a lift support structure 12 and a pivot support structure 13 for supporting an essentially plate-like loading platform 15. The lift support structure includes a lift actuator 16 for raising the loading platform for example from ground level to the loading bed level of the truck and vice versa and the tilt support structure includes a tilt actuator 17 for pivoting the loading platform 15 from a horizontal position to a vertical position and vice versa.

The basic version of a loading platform system 10 is shown schematically in FIGS. 1a–1c to which reference is now made. The figures show schematically only a lift or, respectively, tilt support structure 12, 13. The lift support structure 12 includes a lift actuator 16, which is indicated in the figure as a piston-cylinder arrangement, which may be operated hydraulically or pneumatically. However, the lift actuator 16 may also be an electrically driven mechanism. The lift or respectively, tilt support structure is, at one end, pivotally connected to the loading platform 15 and, at the other end, supported by a suitable structure on the vehicle 11. The lift support structure and, respectively, the tilt support structure of the loading platform 15 may include parallelogram-like support arms as they are well known to the persons knowledgeable in the field. A particular support arrangement is shown and described in the aforementioned U.S. Pat. No. 6,082,958, which is included herein by reference thereto. Each loading platform system however includes at least one lift support structure 12 and, if the loading platform system 10 includes a pivotal loading platform, at least one tilt support structure 13 for pivoting the loading platform from a horizontal to a vertical position and vice versa.

The loading platform system 10 includes at least one locking means 18 by which the loading platform 15 can be releasably locked in its raised end position (see FIG. 1c). The locking means 18 consists essentially of a pin-like locking bolt 19, which is movably supported in a locking bolt guide structure 190 so as to be slideable back and forth in the direction as indicated by the double arrow 191. In addition to the locking bolt 19 and the locking bolt guide structure 190, the locking means 18 includes an engagement structure 20 formed on the loading platform 15. In the embodiment of the loading platform system 10 as shown in the figures, the locking means 18 or rather the pin-like locking bolt 19 is biased by a pressure structure, which is shown as a compression spring 21, in a locking position 22. From this position the locking bolt 19 can be retracted to an unlocking position 23 against the force of the pressure means for the release of the loading platform. It is pointed out that the pressure means 21 may be in another form. It may be, for example, in the form of a hydraulically and/or pneumatically operated piston-cylinder arrangement.

The locking bolt 19 is connected to an operating lever 24 by a cable or a rod 27. The operating lever 24 may be lockable to prevent unintended actuation thereof.

FIG. 1a shows a position of the loading platform system 10 wherein the surface of the loading platform 15 approaches the surface plane of the loading bed 110. The locking bolt 19 is seated in its guide structure 190 in a locking position under the force of the spring 21 against which it can be moved out of its locking position. As the loading platform 15 is further raised by the lift support structure 12 through actuation of the lift actuator 16, the locking bolt 19 is contacted by the engagement structure 20. The engagement structure 20 comprises a roller element 200, by which the locking bolt 19 is pushed back against the force of the spring 21. Upon further raising of the loading platform 15 by the lift actuator 16 the locking bolt 19 can move below the engagement structure 20 (see FIG. 1c), that is, below the roller element 200. In this position in which the locking bolt 19 is held by the spring 21, the loading platform 15 is prevented from being lowered. When the loading platform 15 is to be lowered, the locking bolt 19 must first be retracted by the operating lever 24, whereby the locking bolt is moved out from under the roller element 200. This permits the loading platform 15 again to be lowered by the lift actuator 16.

The loading platform system may also include a platform tilt mechanism 17 (see FIGS. 2a, 2b) for locking the loading platform in a vertical position. The loading platform may then be pivoted from a position as shown in FIG. 1b upwardly in the direction of arrow 29 by actuating the tilt mechanism 17 until it reaches a vertical position as shown in FIG. 2a.

The vehicle body 11 includes a clamp 26, which is open downwardly. When the loading platform 15 is now moved further upwardly the tip of the loading platform 15 (see arrow 29) is engaged by the clamp 26 so that down-pivoting of the loading platform 15 is prevented. At the same time, the locking bolt 19 is moved by the force of the spring 21 below the roller element 20, thereby firmly holding the free end of the loading platform 15 in engagement with the clamp 26. In this way, the loading platform 15 is firmly locked in its vertical position.

Again, the loading platform can be unlocked by retracting the locking bolt 19 by moving the actuating lever 24 thereby pulling the locking bolt 19 out from under the roller element 200 by means of the pull-rod or cable 27. Then the loading platform 15, still in its vertical position, is slightly lowered until its tip or free end is released from the clamp 26. Upon release of the free end of the loading platform 15 from the clamp 26, the loading platform 15 can be pivoted down to a horizontal position in a direction opposite to the direction of the arrow 29.

FIG. 3 shows an embodiment of the invention with a control arrangement for disengaging the locking bolt 19 from the engagement structure 20 of the loading platform. In this embodiment, a pressure medium is utilized. In loading platform systems, a liquid or gas under pressure is generally provided for operating the lift actuator mechanism 16 hydraulically or pneumatically. The pressure medium for operating the lift actuator 16 is supplied to the lift actuator 16 by way of a conduit 14, which, in the present case, is for example a hydraulic line. A magnetic valve 30 is so designed and controlled that the hydraulic medium is admitted to the lift actuator 16 for initiating movement of the loading platform 15 toward the loading bed 110 of the vehicle 11. The lift speed is determined by the amount of the hydraulic medium per time supplied to the lift actuator 16 through the conduit 14. In a loading platform system 10 according to the invention, wherein the loading platform 15 can be locked in its raised position, a magnetic valve 33 is provided which is arranged so as to be energized in parallel with the magnetic valve 30 for controlling a fluid supply to operating means for the lock operating mechanisms. The lock operating mechanism includes a piston cylinder system 31, which is connected to the pressure medium conduit 14 by way of the magnetic valve 33. In this way, hydraulic fluid can be supplied to the cylinder-system 31 whenever hydraulic fluid is supplied to the lift actuator 16. This generates at the same time a force biasing the locking bolt 19 into locking direction.

In a loading platform system 10, the conduit for the pressure medium is normally directly connected to a pressurized medium storage (not shown). When the loading platform 15 is raised, the lift actuator 16 is under pressure. The loading platform 15 exerts a counter pressure by its weight and, if present, a load deposited on the loading platform 15. The pressure of the pressure medium in the lift actuator 16 is selected to be high enough to prevent an uncontrolled lowering of the loading platform 15. When the lowering of the loading platform 15 is desired, this is the medium is released from the lift actuator 16 in a controlled manner. This is done by releasing the pressure medium through a flow controller 34 which is arranged in series with the magnetic valve 30.

In the loading platform system 10 according to the invention, which includes an arrangement for locking the loading platform 15 in a raised position, the valves 30 and 33 are energized in parallel as already mentioned. The valve 32, which is arranged in series with the magnetic valve 30 and the flow controller 34 opens only when the cylinder system 31 is not under pressure. In this way, it is insured that the lowering of the loading platform can be initiated only when the locking bolt 19 is in a retracted position that is when it does not engage the loading platform 15. The valve 32 can be by-passed by way of a check valve 35 for pressurizing the actuator 16.

The arrangement of the loading platform system 10 as described with regard to FIG. 3 can easily be retrofitted to loading platform systems, which are already installed in vehicles but which do not have a locking arrangement for the loading platform 15 in a raised position. It is an important advantage of the arrangement as shown in FIG. 3 that, upon retrofitting, the normal control arrangement for the loading platform system is not disturbed.

Figure 4:
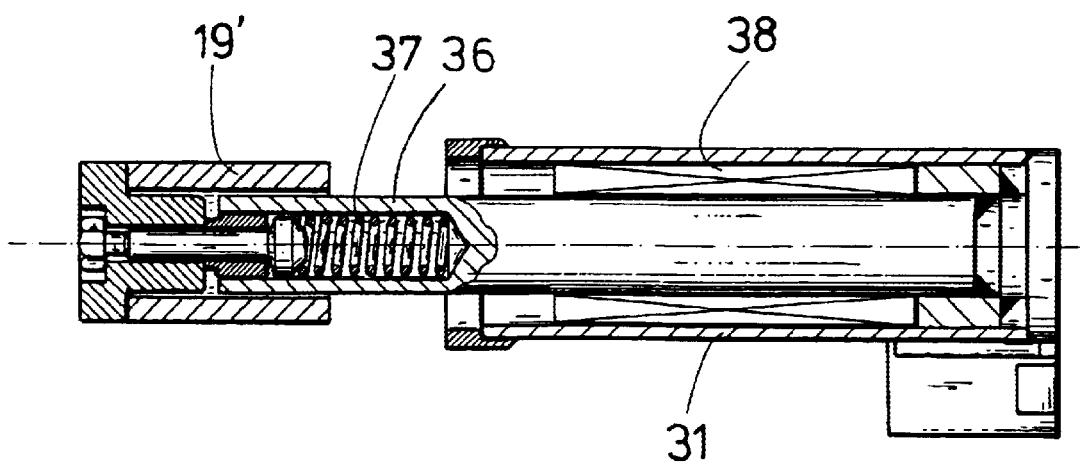
FIG. 4 shows another embodiment of the locking mechanism.

FIG. 4 shows another arrangement for the locking means 18 of FIG. 3, wherein the structure enclosed by the dash-dotted line of FIG. 3 is combined to a locking unit. Here, the locking bolt 19' is mounted directly onto a piston rod 36 of the piston-cylinder system 31. The pressure medium or, respectively, the locking spring 37, comparable to the spring 21 of the arrangement of FIG. 3, is integrated into the piston rod 36. The unlocking spring 38 disposed in the cylinder 31 in the form of a compression spring (FIG. 3) and is schematically shown in FIG. 4.

What is claimed is:

1. A loading platform system for mounting on a vehicle having a loading bed, said system comprising: a loading platform, a lift support structure with a lift actuator for raising and lowering said loading platform between lower and upper end positions and further a tilt structure with a tilt actuator for pivoting said loading platform from a horizontal to a vertical position and vice versa and a single releasable locking means for locking said loading platform in its upper end position level with, and directly to, the loading bed of a vehicle, and also for releasably locking said loading platform in said vertical position.

2. A loading platform system according to claim 1, wherein said locking means includes a pin-like locking bolt disposed in a bolt guide structure and a locking bolt engagement structure disposed on said loading platform for engagement by said locking bolt when said loading platform is in its upper end position or in its vertical position.

3. A loading platform system according to claim 2, wherein said locking bolt engagement structure comprises a roller element, which is seated on said locking bolt when said locking bolt is in its loading platform locking position.

4. A loading platform system according to claim 1, wherein said locking means includes pressure means for holding said locking means in a locking position.

5. A loading platform system according to claim 4, wherein said pressure means is a fluid actuated piston-cylinder system.

6. A loading platform system according to claim 4, wherein said pressure means is a compression spring.

7. A loading platform system according to claim 1, wherein manual unlocking means are provided for releasing said locking means.

8. A loading platform system according to claim 1, wherein means are provided for releasing said locking means by actuation of said lift actuator for lowering said loading platform.

* * * * *